United States Patent
Litvinov et al.

(10) Patent No.: US 8,115,840 B2
(45) Date of Patent: Feb. 14, 2012

(54) IMAGE ENHANCEMENT IN THE MOSAIC DOMAIN

(75) Inventors: Anatoly Litvinov, Binyamina (IL); Alex Alon, Binyamina (IL); Irina Alon, Binyamina (IL); Einat Kidron, Moshav Mishmeret (IL); Uri Kinrot, Hod Hasharon (IL)

(73) Assignee: DigitalOptics Corporation International, San Jose, CA (US)

( * ) Notice: Subject to any disclaimer, the term of this patent is extended or adjusted under 35 U.S.C. 154(b) by 507 days.

(21) Appl. No.: 12/092,904

(22) PCT Filed: Nov. 7, 2006

(86) PCT No.: PCT/IL2006/001284
§ 371 (c)(1),
(2), (4) Date: Sep. 24, 2008

(87) PCT Pub. No.: WO2007/054931
PCT Pub. Date: May 18, 2007

(65) Prior Publication Data
US 2009/0147111 A1    Jun. 11, 2009

Related U.S. Application Data

(60) Provisional application No. 60/735,520, filed on Nov. 10, 2005.

(51) Int. Cl.
*H04N 5/335* (2011.01)
*H04N 9/083* (2006.01)
*H04N 9/64* (2006.01)
*G06K 9/40* (2006.01)

(52) U.S. Cl. .......... 348/280; 348/253; 382/255

(58) Field of Classification Search .......... 348/252, 348/253, 280; 382/255
See application file for complete search history.

(56) References Cited

U.S. PATENT DOCUMENTS

| | | | |
|---|---|---|---|
| 3,971,065 A | 7/1976 | Bayer | |
| 4,697,208 A | 9/1987 | Eino et al. | |
| 6,154,574 A | 11/2000 | Paik et al. | |
| 6,366,318 B1 * | 4/2002 | Smith et al. | 348/273 |
| 6,757,012 B1 | 6/2004 | Hubina | |

(Continued)

FOREIGN PATENT DOCUMENTS
WO    2004/063989    7/2004

(Continued)

OTHER PUBLICATIONS

William K. Pratt: "Superposition and Convolution" in Digital Image Processing, 1991, $2^{nd}$ edition, pp. 171-176.

(Continued)

*Primary Examiner* — Jason Whipkey
(74) *Attorney, Agent, or Firm* — Hickman Palermo Truong & Becker LLP

(57) ABSTRACT

Imaging apparatus includes a mosaic image sensor (24), which is configured to generate a stream of input pixel values belonging to a plurality of input sub-images, each sub-image responsive to light of a different, respective color that is incident on the mosaic image sensor. An image restoration circuit (26) is coupled to receive and digitally filter the input pixel values in each of the input sub-images so as to generate a corresponding plurality of enhanced output sub-images. An image signal processor (ISP) (28) is coupled to receive and combine the plurality of the output sub-images in order to generate a color video output image.

34 Claims, 7 Drawing Sheets

U.S. PATENT DOCUMENTS

| | | | |
|---|---|---|---|
| 6,900,838 | B1 | 5/2005 | Fujimura |
| 7,135,698 | B2 | 11/2006 | Mitra |
| 2003/0122055 | A1 | 7/2003 | Rughani |
| 2005/0025380 | A1 | 2/2005 | Keshet |
| 2006/0013479 | A1* | 1/2006 | Trimeche et al. ............. 382/254 |
| 2006/0279639 | A1* | 12/2006 | Silverstein et al. ...... 348/208.14 |
| 2007/0236573 | A1* | 10/2007 | Alon et al. ............... 348/207.99 |
| 2007/0236574 | A1* | 10/2007 | Alon et al. ............... 348/207.99 |
| 2007/0239417 | A1* | 10/2007 | Alon et al. ............... 348/207.99 |
| 2008/0095466 | A1* | 4/2008 | Kinrot et al. .................. 382/284 |
| 2009/0122180 | A1* | 5/2009 | Shabtay et al. ............... 348/345 |
| 2009/0128666 | A1* | 5/2009 | Rappaport et al. ............ 348/241 |

FOREIGN PATENT DOCUMENTS

| | | |
|---|---|---|
| WO | WO 2004/063989 A | 7/2004 |

OTHER PUBLICATIONS

European Patent Office, "Supplementary European Search Report", Application No. EP 06809844, dated Sep. 10, 2009, 11 pages.

Claims, Application No. EP 06809844, 4 pages.

The State Intellectuall Property of the People's Republic of China, Office Action from China for foreign patent application No. 200680050359.3 (English translation), Applicant: Tessera International, Inc., dated Jan. 26, 2011.

U.S. Appl. No. 12/096,943, filed Oct. 8, 2008.

U.S. Appl. No. 12/096,943, filed Oct. 8, 2008, Office Action, Dec. 23, 2010.

U.S. Appl. No. 12/096,943, filed Oct. 8, 2008, Office Action, Jun. 20, 2011.

* cited by examiner

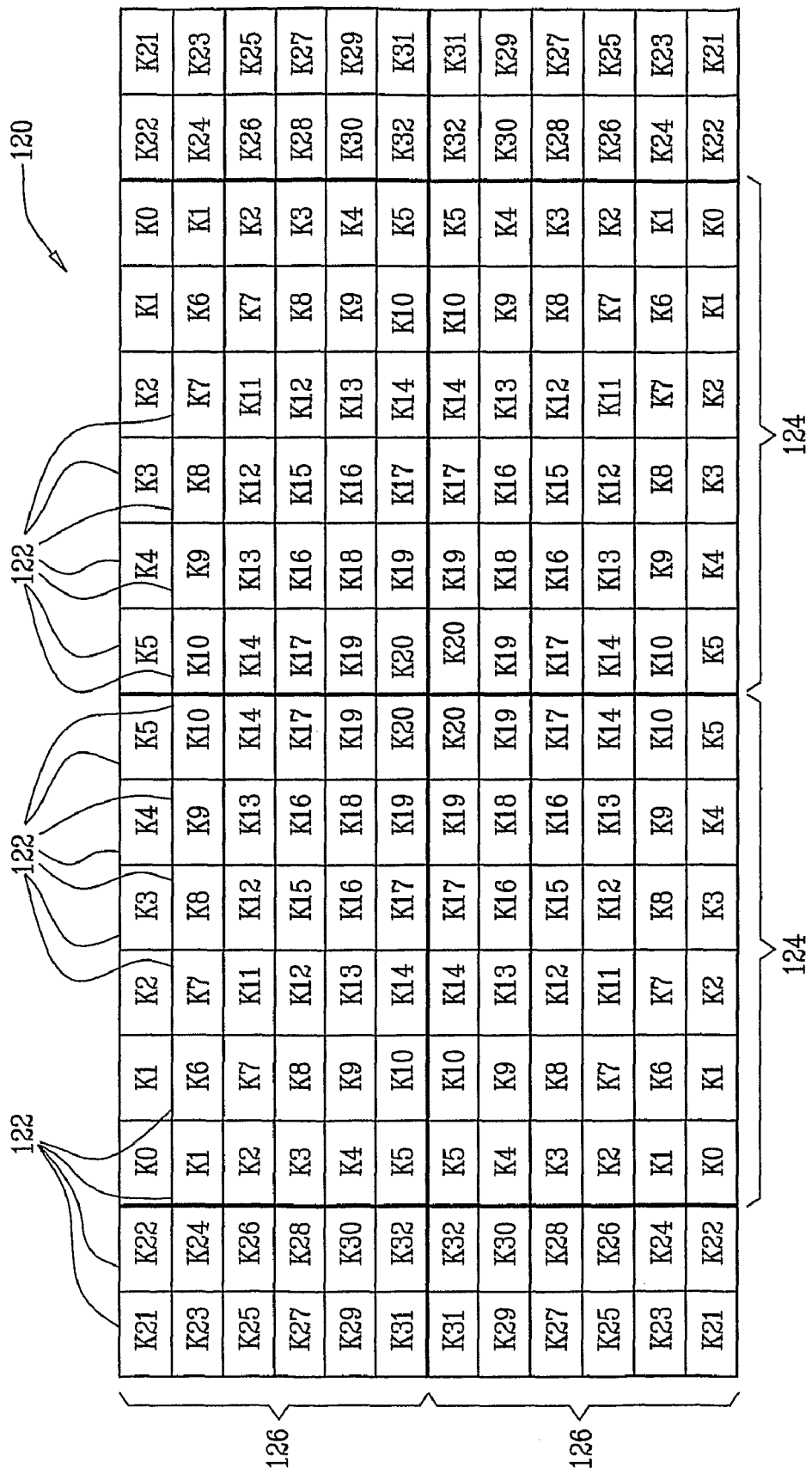

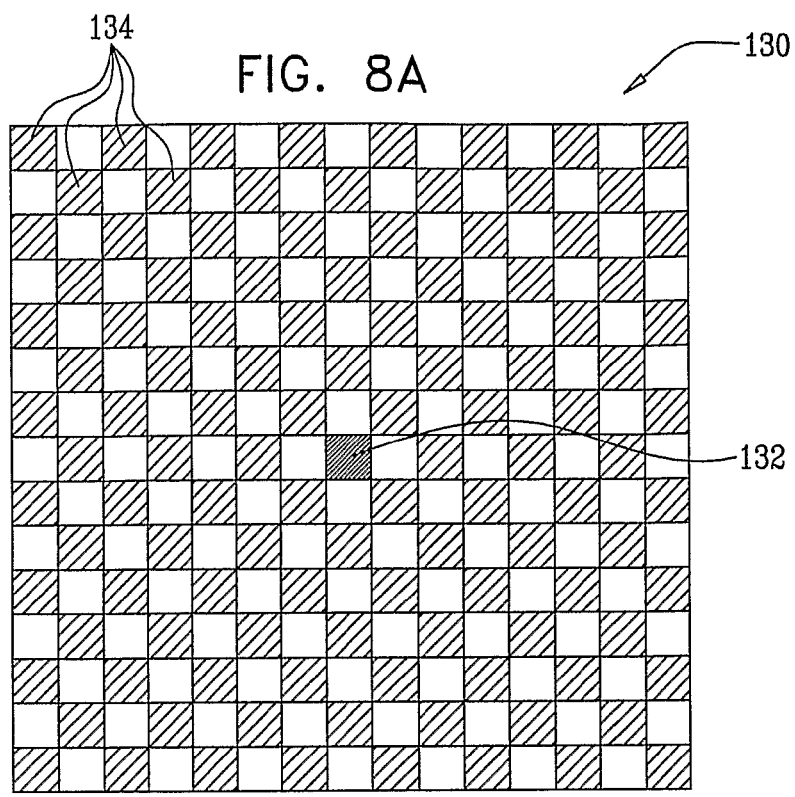
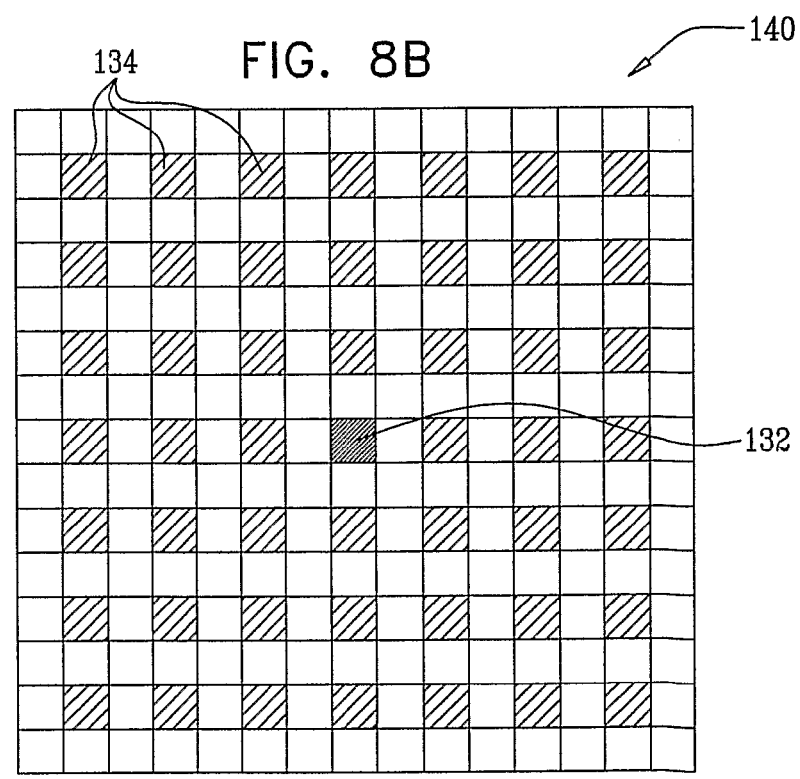

IMAGE ENHANCEMENT IN THE MOSAIC DOMAIN

CROSS REFERENCE TO PRIOR APPLICATIONS

This application is the U.S. national phase of International Application No. PCT/IL2006/001284 filed Nov. 7, 2006, which claims priority from U.S. Provisional Application No. 60/735,520, filed Nov. 10, 2005. The disclosures of both applications are incorporated herein by reference in their entirety. The International Application was published in English on May 18, 2007 as WO 2007/054931 under PCT Article 21(2).

FIELD OF THE INVENTION

The present invention relates generally to digital imaging, and specifically to methods and devices for enhancing image quality in digital cameras.

BACKGROUND OF THE INVENTION

The objective optics used in digital cameras are typically designed so as to minimize the optical point spread function (PSF) and maximize the modulation transfer function (MTF), subject to the limitations of size, cost, aperture size, and other factors imposed by the camera manufacturer. The PSF of the resulting optical system may still vary from the ideal due to focal variations and aberrations. A number of methods are known in the art for compensating for such PSF deviations by digital image processing. For example, U.S. Pat. No. 6,154,574, whose disclosure is incorporated herein by reference, describes a method for digitally focusing an out-of-focus image in an image processing system. A mean step response is obtained by dividing a defocused image into sub-images, and calculating step responses with respect to the edge direction in each sub-image. The mean step response is used in calculating PSF coefficients, which are applied in turn to determine an image restoration transfer function. An in-focus image is obtained by multiplying this function by the out-of-focus image in the frequency domain.

PCT International Publication WO 2004/063989 A2, whose disclosure is incorporated herein by reference, describes an electronic imaging camera, comprising an image sensing array and an image processor, which applies a deblurring function—typically in the form of a deconvolution filter (DCF)—to the signal output by the array in order to generate an output image with reduced blur. This blur reduction makes it possible to design and use camera optics with a poor inherent PSF, while restoring the electronic image generated by the sensing array to give an acceptable output image.

Low-cost color video cameras typically use a single solid-state image sensor with a multi-colored mosaic filter overlay. A mosaic filter is a mask of miniature color filter elements in which a filter element is positioned in front of each detector element of the image sensor. For example, U.S. Pat. No. 4,697,208, whose disclosure is incorporated herein by reference, describes a color image pickup device that has a solid-state image sensing element and a complementary color type mosaic filter. Any sort of image sensor with a color mosaic filter, regardless of the choice and arrangement of the colors in the mosaic, is referred to hereinbelow as a "mosaic image sensor."

The filter elements in the mosaic filter generally alternate between the primary RGB colors, or between the complementary colors cyan, magenta and yellow. One common type of color mosaic filter is called a "Bayer sensor" or "Bayer mosaic," which has the following general form (in which letters represent colors—R denotes red, G denotes green and B denotes blue):

| R | G | R | G | R | G |
| G | B | G | B | G | B |
| R | G | R | G | R | G |
| G | B | G | B | G | B |
| R | G | R | G | R | G |
| G | B | G | B | G | B |

The different color filters have respective passbands, which may overlap. The Bayer mosaic is described in U.S. Pat. No. 3,971,065, whose disclosure is incorporated herein by reference.

Processing the image produced by a mosaic image sensor typically involves reconstructing the full color image by extracting three color signals (red, green and blue) from the sensor output. An image signal processor (ISP) processes the image sensor output in order to compute luminance (Y) and chrominance (C) values for each pixel of the output image. The ISP then outputs these values (or the corresponding R, G and B color values) in a standard video format.

SUMMARY OF THE INVENTION

Embodiments of the present invention provide methods and devices for processing and enhancement of electronic images, and particularly images that are produced by a mosaic image sensor. The sensor outputs a stream of pixel values belonging to a plurality of input sub-images, each of which is due to light of a different, respective color that is incident on the mosaic image sensor. An image restoration circuit filters the pixel values in each of the input sub-images so as to generate corresponding output sub-images with enhanced quality, such as with reduced blur. An image signal processor (ISP) then combines the output sub-images so as to generate a color video output image.

This arrangement has been found to give superior results when compared with conventional methods in which the mosaic sub-images are first combined to reconstruct a color output image before deblurring. Furthermore, in some embodiments, the output sub-images produced by the image restoration circuit are identical in format to the input sub-images produced by the mosaic image sensor, so that the image restoration circuit may be integrated with an existing sensor/ISP combination, between the sensor and the ISP, with little or no change to the sensor or ISP design.

There is therefore provided, in accordance with an embodiment of the present invention, imaging apparatus, including:

a mosaic image sensor, which is configured to generate a stream of input pixel values belonging to a plurality of input sub-images, each sub-image responsive to light of a different, respective color that is incident on the mosaic image sensor;

an image restoration circuit, which is coupled to receive and digitally filter the input pixel values in each of the input sub-images so as to generate a corresponding plurality of enhanced output sub-images; and an image signal processor (ISP), which is coupled to receive and combine the plurality of the output sub-images in order to generate a color video output image.

In a disclosed embodiment, the input sub-images and the output sub-images have identical formats, so that the ISP can be coupled to receive and combine either the output sub-images or the input sub-images. Typically, the input pixel values in the plurality of the input sub-images are interleaved in a predetermined interleaving pattern in a single input pixel stream that is output by the mosaic image sensor, and the output sub-images include output pixel values, which are interleaved by the image restoration circuit in an output pixel stream according to the predetermined interleaving pattern.

In some embodiments, each sub-image has an input blur, and the output sub-images have an output blur, after filtering by the image restoration circuit, that is smaller than the input blur. In one embodiment, the apparatus includes objective optics, which have a point spread function (PSF) that gives rise to the input blur, and the image restoration circuit includes a deconvolution filter (DCF), having a filter kernel determined according to the PSF. The PSF may vary over a plane of the image sensor, and the image restoration circuit may be arranged to apply different filter kernels to the input pixel values from different areas of the image sensor responsively to a variation of the PSF over the plane of the image sensor. Additionally or alternatively, the image restoration circuit may be arranged to apply different filter kernels to the input pixel values depending on a characteristic of the input sub-images.

In some embodiments, the mosaic image sensor includes an array of filters that are arranged in a Bayer mosaic pattern. In one embodiment, the input pixel values include first rows of alternating green and blue pixels and second rows of alternating green and red pixels, and the image restoration circuit includes a green balance unit, which is coupled to compensate for a variation in a sensitivity of the green pixels between the first and second rows. The variation in the sensitivity may be non-uniform over an area of the image sensor, and the green balance unit may be arranged to apply a non-uniform compensation responsively to the non-uniform variation in the sensitivity.

In a disclosed embodiment, the apparatus includes objective optics, which are configured to focus the light onto the mosaic image sensor with a predetermined blur, and the image restoration circuit includes a spike removal unit, which identifies faulty pixels having input pixel values that differ from the input pixel values of neighboring pixels within each of the input sub-images by more than a maximum difference, which is determined according to the blur, and to correct the input pixel values of the faulty pixels.

In some embodiments, the image restoration circuit includes a noise filter, which is arranged to digitally filter each of input sub-images in order to reduce noise in the sub-images. In one embodiment, the noise filter is arranged to determine directions and magnitudes of local gradients in the input sub-images, and to select filter kernels for application in reducing the noise responsively to the directions and the magnitudes.

Additionally or alternatively, the image restoration circuit includes a deconvolution filter (DCF), which is arranged to filter the input sub-images after reduction of the noise by the noise filter. In one embodiment, the image restoration circuit includes an edge detector, which is arranged to identify edge regions in the input images, and to control an input to the DCF so that the DCF receives the input pixel values without noise filtering in the edge regions and receives noise-reduced input pixel values from the noise filter outside the edge regions. The edge detector may be arranged to detect edge pixels, and the image restoration circuit may include a widening unit, which is arranged to widen the edge regions by adding pixels to the edge region around the edge pixels. Typically, the widening unit is arranged to receive from the edge detector an identification of an edge pixel in a first one of the sub-images, and to add to the edge region the pixels in a neighborhood of the edge pixel in at least a second one of the sub-images.

In a disclosed embodiment, the image restoration circuit includes a digital filter, which is arranged to convolve the input sub-images with a kernel of a given size, and a framing extension unit, which is arranged to add a margin of pixel values around the input sub-images, the margin having a width selected responsively to the size of the filter kernel.

In some embodiments, the input pixel values in the plurality of the input sub-images are interleaved in a predetermined interleaving pattern in a single input pixel stream that is output by the mosaic image sensor, and the image restoration circuit includes a digital filter, which is arranged to convolve each of the input sub-images with a respective kernel, which is masked, responsively to the interleaving pattern, so as to filter each of the sub-images separately from the other sub-images.

There is also provided, in accordance with an embodiment of the present invention, a method for imaging, including:

receiving from a mosaic image sensor a stream of input pixel values belonging to a plurality of input sub-images, each sub-image responsive to light of a different, respective color that is incident on the mosaic image sensor;

digitally filtering the input pixel values in each of the input sub-images so as to generate a corresponding plurality of enhanced output sub-images; and combining the output sub-images in an image signal processor (ISP) in order to generate a color video output image.

The present invention will be more fully understood from the following detailed description of the embodiments thereof, taken together with the drawings in which:

BRIEF DESCRIPTION OF THE DRAWINGS

FIG. 7 is a schematic illustration of a set of deconvolution filters that are applied to different parts of an image undergoing restoration, in accordance with an embodiment of the present invention; and FIGS. 8A and 8B are schematic illustrations of deconvolution kernel masks that are applied to sub-images output by a mosaic image sensor, in accordance with an embodiment of the present invention.

DETAILED DESCRIPTION OF EMBODIMENTS

Overview

Figure 1:
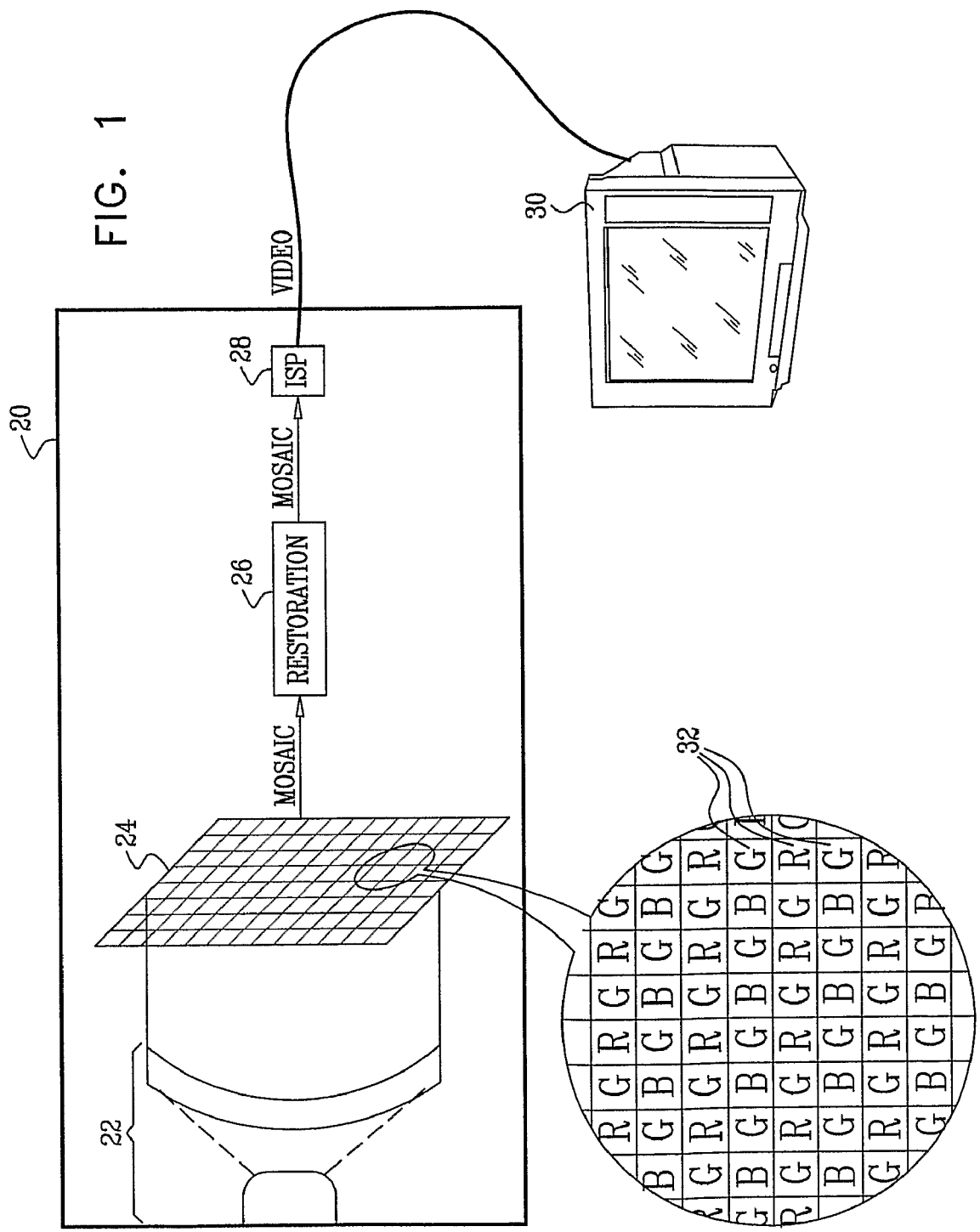
FIG. 1 is a block diagram that schematically illustrates an electronic imaging camera, in accordance with an embodiment of the present invention.

FIG. 1 is a block diagram that schematically illustrates an electronic imaging camera 20, in accordance with an embodiment of the present invention. This specific, simplified camera design is shown here by way of example, in order to clarify and concretize the principles of the present invention. These principles, however, are not limited to this design, but may rather be applied in reducing the blur in images in imaging systems of other types in which a sensor produces multiple sub-images of different colors, which are then combined to produce an enhanced color output image.

In camera 20, objective optics 22 focus light from a scene onto a mosaic image sensor 24. Any suitable type of image sensor, such as a CCD or CMOS image sensor, may be used in the camera. In this example, as well as in the description that follows, the sensor is assumed to have a Bayer-type mosaic filter, so that each pixel 32 in the image signal output by the sensor is responsive to either red, green or blue light. Thus, the mosaic sensor output can be seen as comprising red, green and blue sub-images, made up of the pixel values of the corresponding sensor element. The pixel values belonging to the different sub-images are typically interleaved in the output signal according to the order of the color elements in the mosaic filter, i.e., the sensor outputs one row of RGRGRG . . . (alternating red and green filters), followed by a succeeding row of GBGBGB . . . (alternating green and blue), and so forth in alternating lines. Alternatively, the methods and circuits described hereinbelow may be used, mutatis mutandis, with other types of mosaic sensor patterns.

The stream of pixel values output by image sensor 24 is received and processed by a digital restoration circuit 26. This circuit is described in detail with reference to the figures that follow. The pixel values are digitized prior to processing by circuit 26 by an analog/digital converter (not shown in the figures), which may be integrated with either sensor 24 or circuit 26 or may be a separate component. In any case, circuit 26 processes the red, green and blue input sub-images that are produced by sensor 24 in order to reduce the image blur, as described hereinbelow. Circuit 26 then outputs red, green and blue sub-images with reduced blur.

Typically, circuit 26 outputs the sub-images in the same format in which it received the sub-images from sensor 24. For example, circuit 26 may interleave the pixel values in the output sub-images to generate a single output stream, in which the pixel values have the same interleaving as the input pixel values from sensor 24. Alternatively, circuit 26 may be configured to demultiplex and output each sub-image as a separate data block or data stream.

An ISP 28 receives the deblurred red, green and blue output sub-images from restoration circuit 26 and combines the sub-images to generate a color video output image (or image sequence) in a standard video format. This output image may be displayed on a video screen 30, as well as transmitted over a communication link and/or stored in a memory. In embodiments in which circuit 26 outputs the sub-images in the same format in which it received the sub-images from sensor 24, ISP 28 may be used interchangeably to process either the output of circuit 26 or to process the output of sensor 24 directly. This feature of restoration circuit 26 is advantageous, inter alia, in that it permits the restoration circuit to be used with an existing sensor and ISP without modification to either the sensor or the ISP. It also permits the restoration function of circuit 26 to be switched on and off simply by activating or deactivating a bypass link (not shown) between the sensor and the ISP.

The color video output image generated by ISP 28 typically contains both luminance and color information for each pixel in the image. This information may be encoded in terms of luminance and chrominance (Y/C, for example, or other color coordinates) or in terms of individual color values (such as RGB). By contrast, the sub-images that are processed and output by restoration circuit 26 are monochrome images, containing brightness information only with respect to the particular color that they represent. Each sub-image contains only a subset of the pixels that will appear in the color video output image, i.e., those pixels produced by elements of the image sensor that are covered by the corresponding color filter. In other words, in the example of the Bayer matrix shown in FIG. 1, the R and B sub-images will each contain one fourth of the pixels in the output image, while the G sub-image will contain the remaining half.

Typically, restoration circuit 26 and ISP 28 are embodied in one or more integrated circuit chips, which may comprise either custom or semi-custom components. Although restoration circuit 26 and ISP 28 are shown as separate functional blocks in FIG. 1, the functions of the restoration circuit and the ISP may be implemented in a single integrated circuit component. Optionally, image sensor 24 may be combined with circuit 26 and possibly also ISP 28 on the same semiconductor substrate in a system-on-chip (SoC) or camera-on-chip design. Alternatively, some or all of the functions of restoration circuit 26 and ISP 28 may be implemented in software on a programmable processor, such as a digital signal processor. This software may be downloaded to the processor in electronic form, or it may alternatively be provided on tangible media, such as optical, magnetic or electronic memory media.

Figure 2:
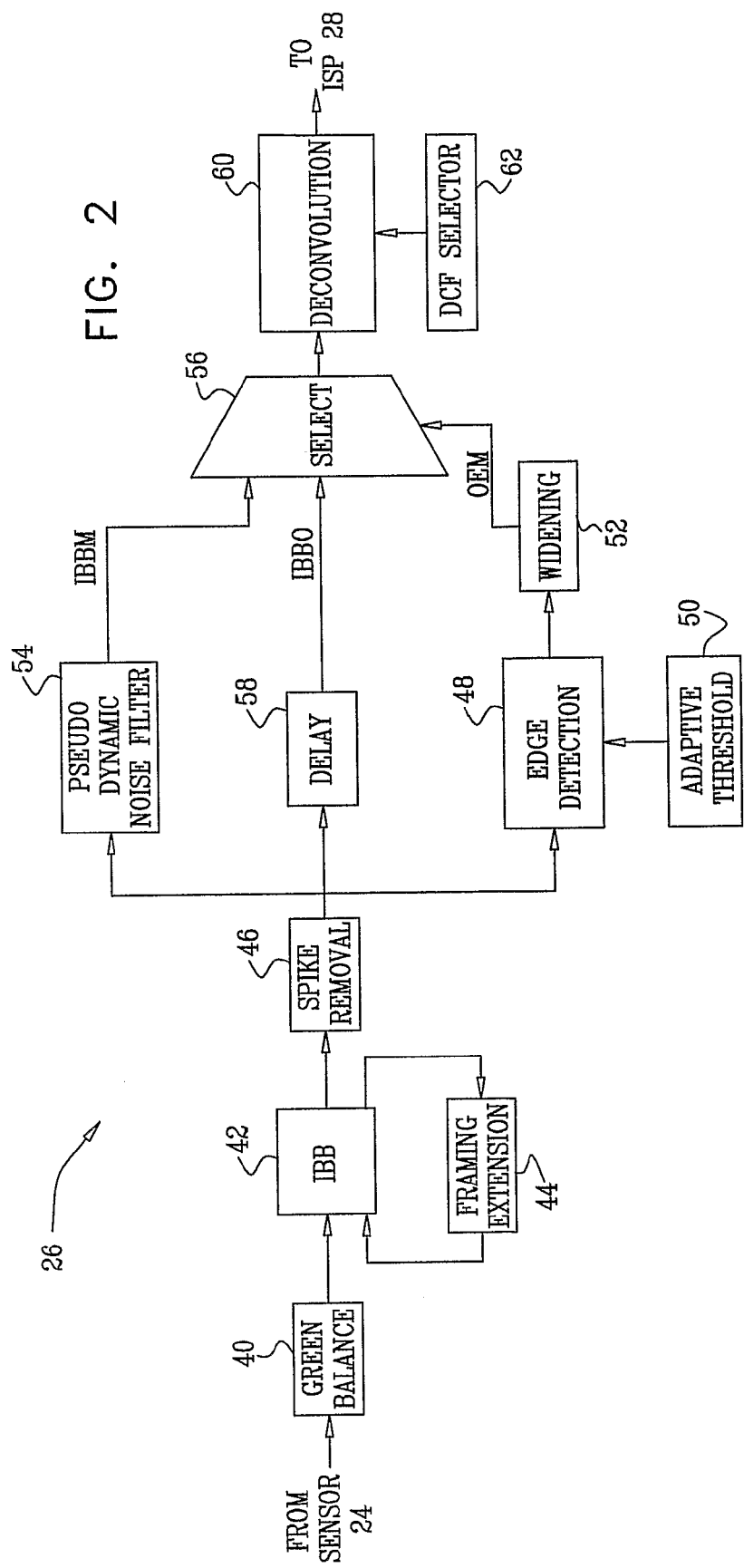
FIG. 2 is a block diagram that schematically shows details of an image restoration circuit, in accordance with an embodiment of the present invention.

FIG. 2 is a block diagram that schematically shows functional components of restoration circuit 26, in accordance with an embodiment of the present invention. Typically, these functional components are embodied together in a single custom or semi-custom integrated circuit device. Alternatively, the functions shown in FIG. 2 may be divided among a number of components, which may carry out the functions in hardware or software. In the exemplary embodiment shown in FIG. 2, circuit 26 performs image restoration by deconvolution filtering to reduce blur of the sub-images before they are combined by ISP 28 into a single color output image. Other image restoration functions performed by circuit 26 on the sub-images include spike removal and noise filtering. Alternatively or additionally, circuit 26 may be configured to carry out only one or two of these restoration functions, or to carry out additional digital filtering functions in the space of the mosaic sub-images.

A green balance unit 40 balances the Green-red (Gr) and Green-blue (Gb) pixel values for possible amplitude variations. Gr and Gb refer to the green pixels that occur in the RGRGRG . . . rows and GBGBGB . . . rows, respectively. Details of the operation of unit 40 are described below in the section entitled "Green Balance."

The green-balanced image data are held in an Input Blurred Bayer (IBB) buffer 42. A framing extension unit 44 adds rows and columns of dummy pixels to the buffer to ensure correct processing of pixels at the margins of the actual image. The organization and contents of buffer 42 and the operation of unit 44 are described hereinbelow with reference to FIG. 3.

A spike removal unit 46 identifies and modifies the values of faulty pixels, in order to prevent propagation of noise from these pixels into the processed image. The spike removal operation is described hereinbelow with reference to FIG. 4.

An edge detection unit 48 determines the locations of edge pixels in each sub-image, based on adaptive threshold values 50. A widening unit 52 then applies a morphological operation to generate an output edge mask (OEM) containing the edge regions. The mask, for example, may have the value "1" at pixels in the edge regions and "0" elsewhere. Circuit 26 refrains from applying noise suppression to these edge regions in order to avoid loss of edge information. These edge identification functions are described hereinbelow with reference to FIG. 5.

A pseudo-dynamic noise filter 54 is applied to reduce noise in each sub-image, thus generating IBB modified (IBBM) pixel values. The operation of filter 54 is described hereinbelow with reference to FIG. 6. A selector 56 then selects the appropriate value of each pixel to pass to a deconvolution filter 60 based on the corresponding value of the OEM provided by unit 52. The selector chooses the IBBM values of non-edge pixels and the unmodified IBB original (IBBO) values of pixels, taken directly from IBB buffer 42, in the edge regions. The IBBO values are delayed by a delay line 58 in order to maintain proper synchronization of the IBBO and IBBM pixel streams.

Deconvolution filter (DCF) 60 performs a deblurring operation on each of the sub-images individually. Filter 60 typically uses a kernel that is roughly inverse to the point spread function (PSF) of optics 22, in order to "undo" the effects of the aberrations of the optics. Methods for computing deconvolution kernels of this sort are described, for example, in the above-mentioned WO 2004/063989 A2, as well as in U.S. patent application Ser. No. 11/278,255, filed Mar. 31, 2006, which is assigned to the assignee of the present patent application and whose disclosure is incorporated herein by reference. Alternatively, other sorts of filter kernels may be applied by filter 60, whether for deblurring or for other image processing functions that are known in the art. The kernels are typically masked so that each of the sub-images is filtered independently of the other sub-images, notwithstanding the interleaving of the sub-images in the input pixel stream. Exemplary mask patterns are shown in FIGS. 8A and 8B.

In many cameras, the PSF of the optics is not uniform over the entire field of view of the camera. Thus, in camera 20, for example, different areas of image sensor 24 may be subject to different PSF profiles. Therefore, for optimal deblurring, a DCF selector 62 applies different filter kernels to the pixels in different parts of the image. An exemplary arrangement of such filter kernels is described hereinbelow with reference to FIG. 7. After processing by filter 60, the deblurred sub-images are then output to ISP 28.

Green Balance

This section will describe the operation of green balance unit 40 in further detail. Theoretically, the light sensitivities of the sensor elements corresponding to Gr- and Gb-type green pixels should be identical, but in practice, the sensitivities may be different due to design and manufacturing tolerances. Failure to correct for the difference in sensitivity can result in fixed-pattern artifacts in the output image. Therefore, circuit 40 multiplies either the Gr or Gb pixel values (or both) by a correction factor.

To determine the correction factor, it is assumed that averages (and hence the sums) of the pixel values in successive rows of the green sub-image should be equal. The sums are computed by circuit 40 and represented as sumGreenRed and sumGreenBlue, respectively. The quotient of the sums gives the correction factor f:

$$f = \frac{sumGreenRed}{sumGreenBlue} = 1 + \varepsilon \quad (1)$$

$$\varepsilon = \frac{sumGreenRed - sumGreenBlue}{sumGreenBlue} \quad (2)$$

To avoid creating artifacts in low-light conditions (where the values involved are close the zero), circuit 40 computes f only when sumGreenRed and sumGreenBlue exceed some minimum threshold. Furthermore, $\varepsilon$ is limited to a certain expected range of green imbalance, such as $-\frac{1}{32} \leq \varepsilon \leq \frac{1}{32}$. The values of the Gb pixels are corrected by multiplying them by f:

$$G_{b\_output} = G_b * f \quad (3)$$

These corrected values are substituted for the original Gb pixel values in the subsequent computation. Alternatively, the correction factor may be computed and applied to the Gr pixel values instead, or divided for correction to both Gb and Gr.

The variation in the sensitivity of the Gr and Gb pixels may be non-uniform over the area of sensor 24. In this case, circuit 40 may apply a variable value of f over the area of the image in response to the non-uniform variation in the sensitivity.

Framing and Buffering

After green balance, the pixels are inserted into an input blurred Bayer (IBB) buffer 42. Assuming circuit 26 operates "on the fly," processing the pixel values are output by sensor 24, and that filter 60 uses a kernel containing L rows of values (for example, L=15), buffer 42 may be designed to hold L complete rows of input pixel values. As each new row is read into the buffer, the oldest row is discarded from the buffer. Additional rows and columns of dummy pixels are added above, below, to the right and to the left of the actual image frame to avoid creating artifacts due to filtering near the margins of the image.

Figure 3:
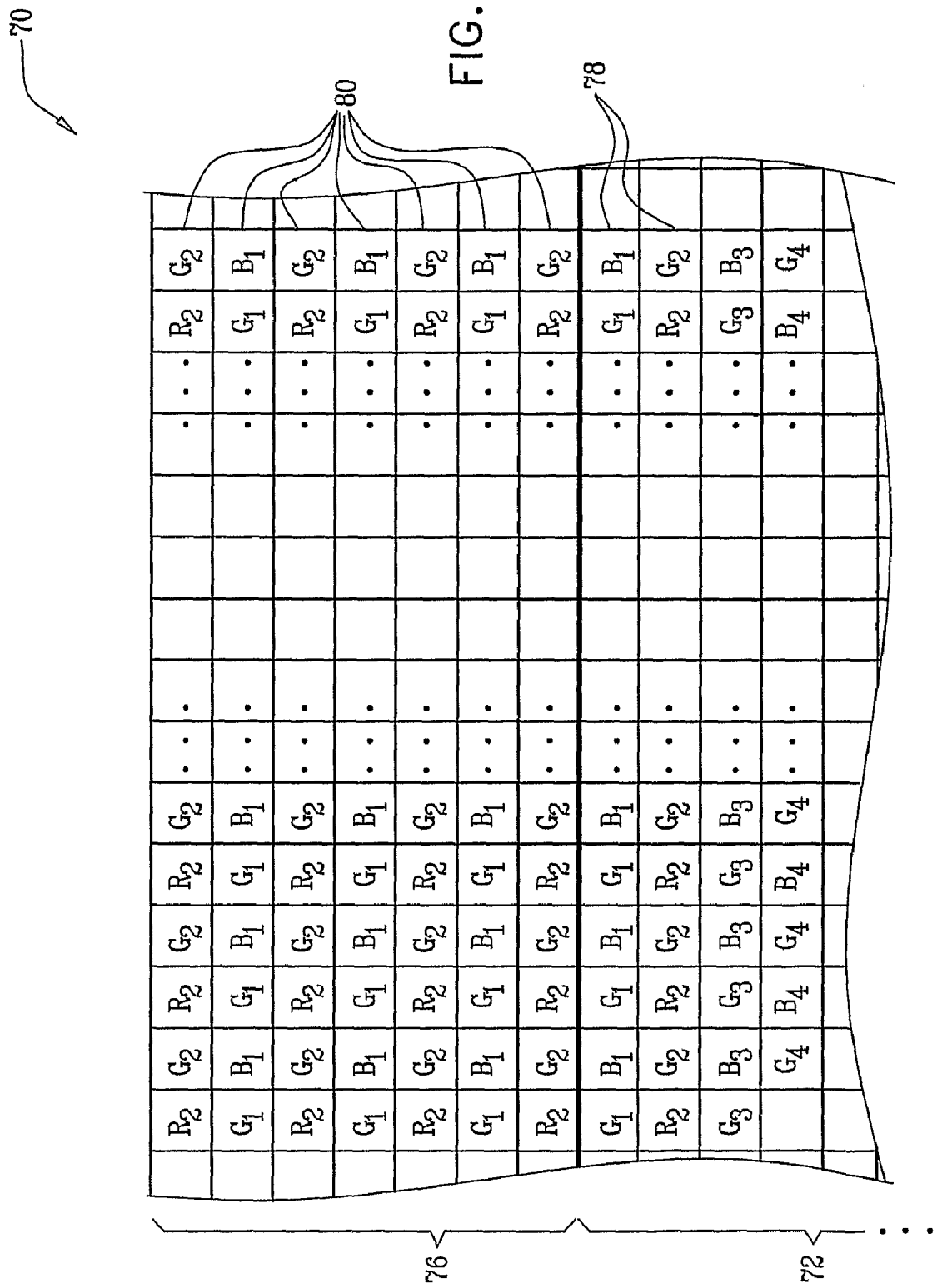
FIG. 3 is a schematic detail view of the contents of a portion of an input buffer, illustrating an image framing technique used in an image restoration circuit, in accordance with an embodiment of the present invention.

FIG. 3 is a schematic detail view of a portion 70 of the contents of buffer 42 near the upper margin of an image captured by sensor 24, illustrating a method used for framing the image in accordance with an embodiment of the present invention. Rows 72 in the buffer contain actual pixel values, in alternating rows of GBGB . . . and RGRG . . . . The subscripts 1, 2, 3, 4, . . . , indicate the row number, starting from row 1 at the upper edge of the input image. A framing margin 76 of seven additional rows is added above the first row in the input image. These additional rows reflect the pixel values in the first two rows of the actual input frame. Comparable margins, reflecting the two marginal rows or columns, are added below and to the left and right of the input image.

Framing extension unit 44 adds margin 76 in order to ensure that DCF 60 does not introduce spurious data into the output pixel values that are conveyed to ISP 28. The extent of the framing margin depends on the size of the DCF kernel. Thus, for L=15, seven framing rows and columns are required for this purpose, as shown in FIG. 3. Alternatively, kernels and framing margins of different sizes may be used. Edge detection unit 48 may find spurious edges in the rows of framing margin 76, and filter 60 may convolve the contents of the framing margin with pixels in the lower framing margin of the previous frame, but the actual pixel data in rows 72 will be unaffected by these operations. (Additional framing rows and/or columns may be used if necessary, depending on the kernels used by edge detection unit 48 and widening unit 52, in order to avoid propagation of spurious edges in the OEM from the framing margins into the frame of actual pixel data.)

The pixel values in the rows and columns of the framing margin are used only internally within circuit 26. These pixel values are dropped after filter 60 has completed its operation and are not passed to ISP 28.

Spike Removal

In some applications of circuit 26, optics 22 are of relatively low quality and produce a blurred image on image sensor 24, as explained in the above-mentioned WO 2004/063989 A2 and U.S. patent application Ser. No. 11/278,255. In other words, the PSF of the optics extends over a number of neighboring pixels, and the optics act as a sort of low-pass spatial filter. As a result, each detector element in image sensor 24 senses light collected from an area of the image scene, which overlaps with the sensing areas of the neighboring detector elements. Edges and other local variations in the input image are therefore smoothed, so that it is physically impossible for a given pixel value to be too far different from the values of neighboring pixels of the same color. The PSF of the optics can be used to determine a threshold such that differences between the value of a pixel and the values of the neighboring pixels of the same color that are greater than the threshold must be due to noise or a defect in the image sensor.

Figure 4:
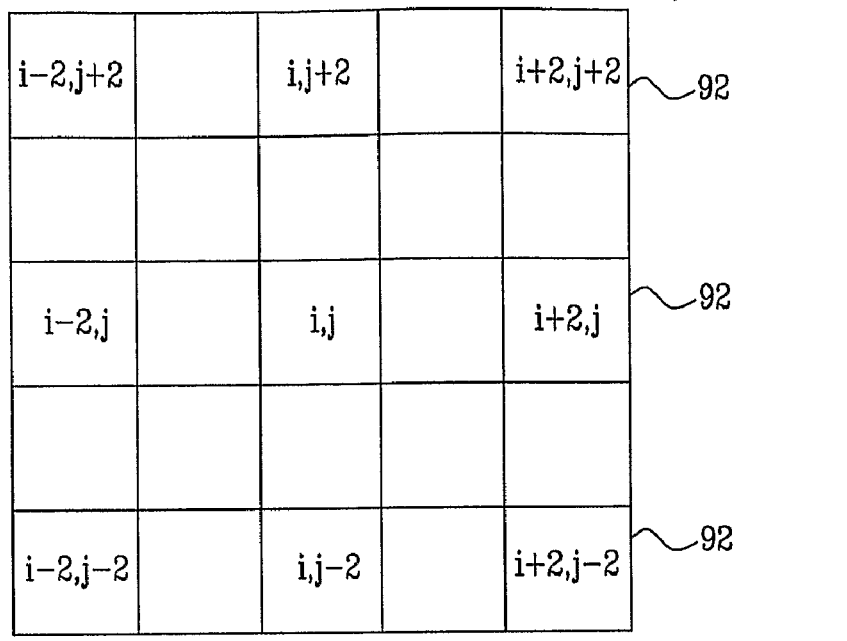
FIG. 4 is a schematic illustration of a mask used for spike removal in an image restoration circuit, in accordance with an embodiment of the present invention.

FIG. 4 is a schematic illustration of a mask 90 that is used by spike removal unit 46 to identify and correct faulty pixels, in accordance with an embodiment of the present invention. For pixel p(i,j), the spike removal unit considers neighboring pixels 92 of the same color, i.e., pixels two rows above or below and two columns to the right or left of the current pixel, as shown in the figure. (Thus, Gr and Gb pixels are typically considered separately, although the two green pixel types may alternatively be combined for purposes of spike removal. For pixels at the margins of the image frame, as described above, the spike removal unit may consider only the values of actual pixels that fall within mask 90, and not the mirrored values in margin 76.) For each input pixel value p(i,j), the spike removal unit determines an output pixel value as follows:

$$\tilde{p}(i,j) = \begin{cases} \min\left\{p(i,j), \left[\frac{\max\langle p(i+\Delta i, j+\Delta j)\rangle_{\Delta i,\Delta j=-2,0,2;\overline{\Delta i=\Delta j=0}} +}{\text{threshold}_+}\right]\right\} \\ \max\left\{p(i,j), \left[\frac{\min\langle p(i+\Delta i, j+\Delta j)\rangle_{\Delta i,\Delta j=-2,0,2;\overline{\Delta i=\Delta j=0}} -}{\text{threshold}_-}\right]\right\} \end{cases} \quad \text{equation (4)}$$

In other words, if the value of p(i,j) is greater than the maximum value of its neighbors of the same color (as provided by mask 90) by more than threshold$_+$, the value is replaced by the maximum value of these neighbors plus threshold+. Similarly, if the value of p(i,j) is less than the minimum value of its neighbors of the same color by more than threshold$_-$, the value is replaced by the minimum value of these neighbors minus threshold$_-$. The threshold values can be calculated based on the optical characteristics of the camera and/or the type of image (indicating whether highly-localized deviations in pixel values are to be expected), or they may be set heuristically according to other criteria. As a result of the operation of unit 46, pixels that are much brighter or much darker than the other pixels in their neighborhoods are smoothed over so as not to deviate any farther than permitted from their neighbors.

Edge Detection and Widening

Edge detection unit 48 may use any suitable kernel to detect the locations of edges in the input image. The inventors have found it advantageous, for computational simplicity, to include in the edge detection kernel only pixels that are in the same column or row as the current pixel in the edge calculation. Alternatively, the kernel may include diagonal elements, as well. Some exemplary kernels and edge detection procedures are described hereinbelow. The optimal choice of kernel depends on the content of the image and the preferences of the user, in trading off edge sharpness for residual noise that may remain in the edge areas of the OEM. Alternatively, unit 48 may employ other methods of edge detection that are known in the art.

As noted above, the edge detection methods applied by unit 48 use an adaptive threshold 50, which is referred to as Edge_threshold_value in the description that follows. The value of this threshold is typically calculated on the basis of the light conditions of the image being processed. These conditions may be measured internally in circuit 26 based on the average pixel values. Alternatively, the threshold value may be calculated based on color gain parameters that are automatically computed and output by ISP 28. For example, the threshold value may be computed as a weighted sum of color gains or other brightness parameters. The weighting coefficients may be selected to give the desired trade-off of edge sharpness against residual noise.

Mode 1—Simple Gradient Edge Detector

This edge detector detects an edge in the vicinity of pixel p(i,j) with high resolution. The pixels in the formulas below are indexed according to the scheme shown in FIG. 4, and the gradient values are computed as follows:

$$d_{x-1} = |p(i,j) - p(i-2,j)|$$

$$d_{x+1} = |p(i,j) - p(i+2,j)|$$

$$d_{y-1} = |p(i,j) - p(i,j-2)|$$

$$d_{y+1} = |p(i,j) - p(i,j+2)| \quad (5)$$

The edge value e(i,j), which is output to widening unit 52, is 1 when pixel p(i,j) is on an edge and 0 otherwise, so that e(i,j)=1 if any of the gradient values is greater than the threshold, i.e., if any of following inequalities evaluates to TRUE:

$$\begin{cases} d_{x-1} > \text{Edge\_threshold\_value} \\ d_{x+1} > \text{Edge\_threshold\_value} \\ d_{y-1} > \text{Edge\_threshold\_value} \\ d_{y+1} > \text{Edge\_threshold\_value} \end{cases} \quad (6)$$

Mode 2—Sophisticated Gradient Edge Detector

This edge detector is a compromise between high resolution and good step detection with minimum false detection. In this case, the gradient values are given by:

$$d_{x-1} = p(i-2,j) - p(i,j) \; g_{x-1} = p(i-4,j) - p(i-2,j)$$

$$d_{x+1} = p(i+2,j) - p(i,j) \; g_{x+1} = p(i+4,j) - p(i+2,j)$$

$$d_{y-1} = p(i,j-2) - p(i,j) \; g_{y-1} = p(i,j-4) - p(i,j-2)$$

$$d_{y+1} = p(i,j+2) - p(i,j) \; g_{y+1} = p(i,j-4) - p(i,j-2)$$

The edge value e(i,j) is set to 1 if any of the following inequalities evaluates to TRUE:

$$\begin{cases} (|d_{x-1}| > \text{Edge\_threshold\_value}) \text{ and} \\ (|d_{x-1}| > |g_{x-1}| \text{ or } d_{x-1} \cdot g_{x-1} \leq 0) \\ (|d_{x+1}| > \text{Edge\_threshold\_value and} \\ (|d_{x+1}| > |g_{x+1}| \text{ or } d_{x+1} \cdot g_{x+1} \leq 0) \\ (|d_{y-1}| > \text{Edge\_threshold\_value and} \\ (|d_{y-1}| > |g_{y-1}| \text{ or } d_{y-1} \cdot g_{y-1} \leq 0) \\ (|d_{y+1}| > \text{Edge\_threshold\_value and} \\ (|d_{y+1}| > |g_{y+1}| \text{ or } d_{y+1} \cdot g_{y+1} \leq 0) \end{cases} \quad (8)$$

Mode 3—Step Edge Detector

This edge detection method detects step edges. It uses an edge step parameter, edge_step, which is typically set to the value 2. The method proceeds as follows:

Calculate delta_minus1_$x$=|p($i$−3*edge_step,$j$)−p($i$−edge_step,$j$)|

Calculate delta_null_$x$=|p($i$−edge_step,$j$)−p($i$+edge_step,$j$)|

Calculate delta_plus1_$x$=|p($i$+3*edge_step,$j$)−p($i$+edge_step,$j$)|

Calculate delta_minus1_$y$=|p($i,j$−3*edge_step)−p($i,j$−edge_step)|

Calculate delta_null_$y$=|p($i,j$−edge_step)−p($i,j$+edge_step)|

Calculate delta_plus1_$y$=|p($i,j$+3*edge_step)−p($i,j$+edge_step)|

The edge value e(i,j) is set to 1 if either of the following conditions is satisfied:

delta_null_$y$−max(delta_minus1_$y$,delta_plus1_$y$)>Edge_Threshold_Value OR delta_null_$x$−max(delta_minus1_$x$,delta_plus1_$x$)>Edge_Threshold_Value.

Note that in this case, the value of e(i,j) does not depend on the actual intensity of pixel p(i,j).

Edge Widening

Figure 5:
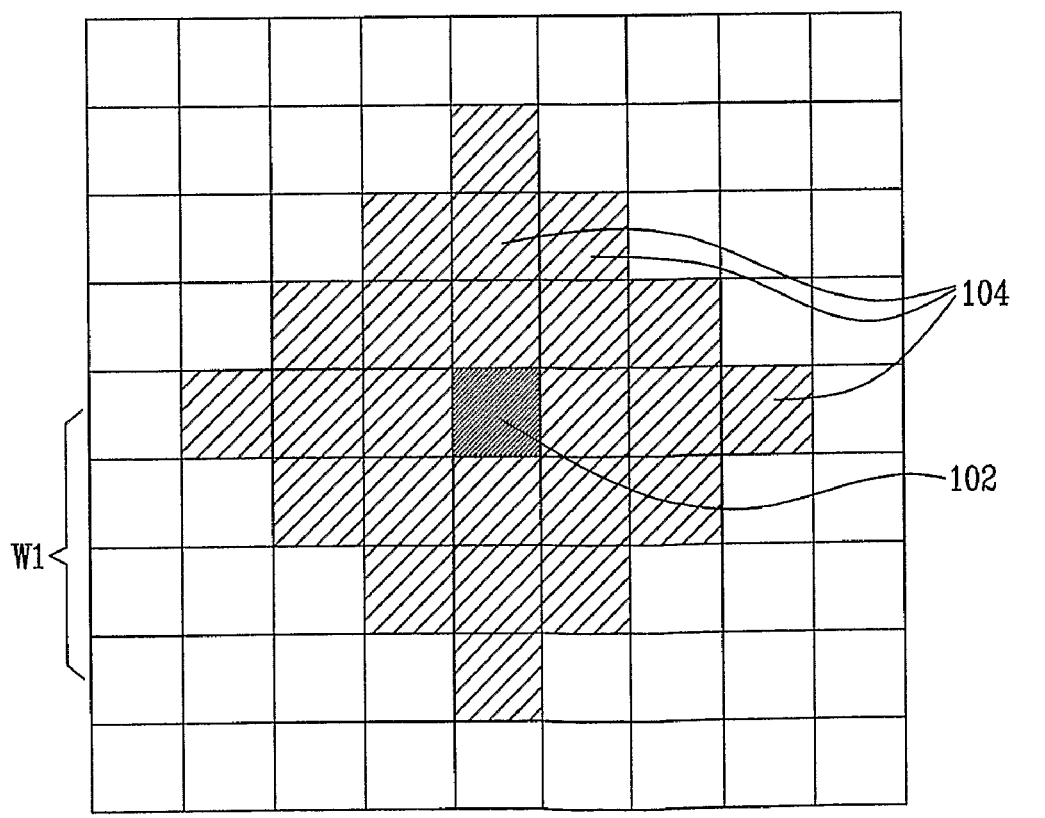
FIG. 5 is a schematic illustration of a mask used for edge enhancement in an image restoration circuit, in accordance with an embodiment of the present invention.

FIG. 5 is a schematic illustration of a mask 100 used by widening unit 52, in accordance with an embodiment of the present invention. Edge detection unit 48 outputs an edge map E(x,y) containing the edge values e(i,j) determined for each pixel. The widening unit applies morphological dilation to the edge map using mask 100, which is referred to as W(x,y). The output of this widening step is the OEM:

$$\text{OEM}(x,y) = E(x,y) \oplus W(x,y) \quad (9)$$

This OEM is applied as the switching input to selector 56, as explained above.

The degree of widening that is applied to the edges depends on the mask parameter W1. In the example shown in FIG. 5, W1=3. In other words, if a given pixel 102 at the center of mask 100 is identified by edge detection unit 48 as an edge location (e(i,j)=1), then that pixel and surrounding pixels 104 within the mask area receive the value "1" in the OEM. It was found to be advantageous to extend this edge widening over pixels of different colors, i.e., belonging to different sub-images (unlike the other digital filtering processes carried out in circuit 26, which are color-specific). The value of W1 may be chosen according to application requirements and user preferences, depending on the desired width of the edge regions that are to be protected from low-pass noise filtering.

Noise Filter

Noise filter 54 uses a kernel that averages the current pixel value with the values of neighboring pixels of the same color, such as pixels 92 in FIG. 4. The filter determines output pixel values as follows:

$$\tilde{p}(i,j) = \sum_{a=-2,0,2} \sum_{b=-2,0,2} v(i+a, j+b) \cdot p(i+a, j+b) \quad (10)$$

Here v(i,j) is the value of the (i,j) filter kernel coefficient, and p(i,j) is the input pixel value. In the description that follows, the central element of the filter kernel v(i,j) is denoted $v_c$; peripheral elements of the filter v(i±2,j) and v(i,j±2) are denoted $v_p$; and corner elements of the filter v(i±2,j±2) are denoted $v_f$.

Figure 6:
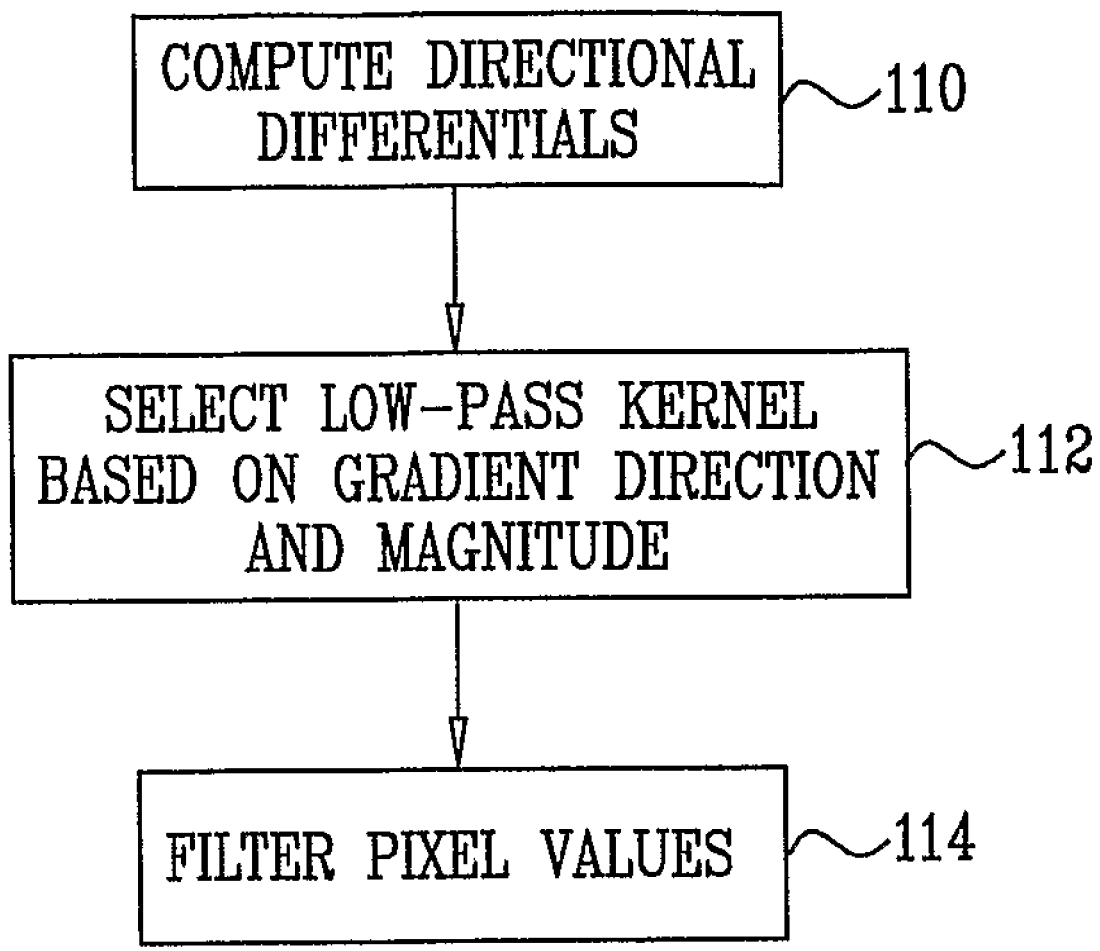
FIG. 6 is a flow chart that schematically illustrates a method for noise filtering, in accordance with an embodiment of the present invention.

FIG. 6 is a flow chart that schematically illustrates a method for pseudo-dynamic noise filtering that is applied by filter 54, in accordance with an embodiment of the present invention. The purpose of this method is to avoid degradation of the image resolution and contrast that may result when the filter operates indiscriminately on regions of the image in which there are variation gradients among the pixel values. For this purpose, filter 54 computes local directional differentials at each pixel, at a differential computation step 110. The differentials may be calculated as follows:

$$\Delta v = |p(i,j-2)-p(i,j+2)|$$

$$\Delta h = |p(i-2,j)-p(i+2,j)|$$

$$\Delta d_1 = |p(i-2,j-2)-p(i+2,j+2)|$$

$$\Delta d_2 = |p(i-2,j+2)-p(i+2,j-2)| \quad (11)$$

(The vertical differential term Δv should not be confused with the kernel coefficients v(i,j).)

Filter 54 then selects the appropriate kernel based on the magnitudes of the directional differentials, at a kernel selection step 112. For this purpose, the calculated values Δv, Δh are compared with a vertical/horizontal threshold $th_{v,h}$, and the values of $\Delta d_1$, $\Delta d_2$ are compared with a diagonal threshold $th_d$:

If Δv>$th_{v,h}$ then v(i,j±2) do not participate in noise removal, and the corresponding $v_p$ values are 0.

If Δh>$th_{v,h}$ then v(i±2,j) do not participate in noise removal, and the corresponding $v_p$ values are 0.

If $\Delta d_1$>$th_d$ then v(i+2,j+2) and v(i−2,j−2) do not participate in noise removal, and the corresponding $v_f$ values are 0.

If $\Delta d_2$>$th_d$ then v(i−2,j+2) and v(i+2,j−2) do not participate in noise removal, and the corresponding $v_f$ values are 0.

Filter 54 selects a kernel for use at each pixel that satisfies the above conditions. An exemplary set of nine filter kernels that may be used for this purpose is listed in Appendix A below. Other noise-removal filter kernels (dynamic or static) may similarly be used, as will be apparent to those skilled in the art.

Filter 54 applies the selected kernel to the input pixel values in the neighborhood of each pixel in order to generate the output pixel value p̃(i,j) for each pixel, at a filtering step 114.

Deconvolution Filtering

FIG. 7 is a schematic illustration of a set 120 of DCF kernels 122 that are applied to the pixel values input to DCF 60 by selector 56, in accordance with an embodiment of the present invention. In this example, it is assumed that an input image of 1600×1200 pixels is divided into 192 segments of 100×100 pixels each. DCF 60 applies a different kernel 122 (identified as K0, K1, ..., K32) to each segment, depending on the local PSF at the corresponding location in the image. Because of the circular symmetry of optics 22, the PSF variations are also assumed to be symmetrical over the image plane, so that only thirty-three different kernels need be stored and used in this configuration. Central regions 124 all use the same set of twenty-one kernels, while peripheral regions 126 use another set of twelve kernels. Alternatively, the image area may be divided into larger or smaller segments for purposes of kernel assignment, or a single DCF kernel may be applied to the entire image.

Additionally or alternatively, DCF selector 62 may change the set of filter kernels on the fly, depending on the characteristics of the image captured by camera 20 (and hence of the input sub-images). For example, the DCF selector may choose different filter kernels depending on the image illumination level, type of image content, or other factors.

FIGS. 8A and 8B are schematic illustrations showing the respective layouts of kernel masks 130 and 140 that are applied by DCF 60, in accordance with an embodiment of the present invention. Each mask indicates the pixels of a respective color, i.e., the pixels belonging to a particular sub-image in the 15×15 pixel mask area. Mask 130 applies to the green pixels, while mask 140 applies to the red and blue pixels. Thus, when a central pixel 132 covered by mask 130 is green, shaded pixels 134 indicate the other green pixels in the neighborhood of 15×15 pixels around the central pixel. When central pixel 132 covered by mask 140 is red or blue, shaded pixels 134 indicate the other red or blue pixels in the neighborhood.

For each pixel of the input image, DCF 60 selects the appropriate 15×15 kernel for the region 122 in which the pixel is located, and then masks the kernel using mask 130 or 140, depending on the current pixel color. Only shaded pixels 134 of the appropriate mask in each case participate in the DCF operation. The coefficients of non-shaded pixels are set to zero. Therefore, each pixel value is convolved only with pixel values belonging to the same sub-image (i.e., pixels of the same color). The pixel values to be convolved are chosen by selector 56, as noted above, which chooses the IBBO values output by delay line 58 in edge regions and noise-reduced IBBM values in non-edge regions.

As noted earlier, the kernel coefficients applied by DCF 60 may be chosen to deblur the output image in response to the imperfect PSF of optics 22. The kernels may be varied depending on both the location of the current pixel in the image plane and on other factors, such as the image distance. The optics and DCF kernels may be chosen to provide specific image enhancement functions, such as increasing the effective depth of field of camera 20. Alternatively, the arrangement of DCF 60, with different filtering operations applied in alternation to sub-images of different colors, may be used to carry out a wide variety of other image enhancement functions in the mosaic color space.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

NOISE REMOVAL FILTER KERNELS

The table below shows exemplary noise filter coefficient values under different edge conditions. The sum of all the coefficients in each filter is 1, so that the average pixel values will not change after filtering. In the example below, all the coefficient values for the possible kernels in filter 54 are explicitly written. Alternatively, only some of the coefficients may be given explicitly, while the rest are inferred by the condition that the sum is 1. For simplicity, it may be assumed that the central coefficient $v_c$ equals 1 minus the sum of all the other coefficients that are used in a specific kernel.

| | Central filter value $v_c$ | Non-zero peripheral $v_p$ filter values | Non-zero corner $v_f$ filter values | Conditions |
|---|---|---|---|---|
| 1 | 0.375 | 0.125 | 0.03125 | $\Delta v \leq th_{vh}$ and $\Delta h \leq th_{vh}$ and $\Delta d_1 \leq th_d$ and $\Delta d_2 \leq th_d$ |
| 2 | 0.375 | 0.1875 | 0.0625 | $[(\Delta v > th_{vh}$ and $\Delta h \leq th_{vh})$ or $(\Delta v \leq th_{vh}$ and $\Delta h > th_{vh})]$ and $\Delta d_1 \leq h_d$ and $\Delta d_2 \leq th_d$ |
| 3 | 0.625 | — | 0.09375 | $(\Delta v > th_{vh}$ and $\Delta h > th_{vh})$ and $\Delta d_1 \leq th_d$ and $\Delta d_2 \leq th_d$ |
| 4 | 0.375 | 0.125 | 0.0625 | $(\Delta v \leq th_{vh}$ and $\Delta h \leq th_{vh})$ and $[(\Delta d_1 > th_d$ and $\Delta d_2 \leq th_d)$ or $(\Delta d_1 \leq th_d$ and $\Delta d_2 > th_d)]$ |
| 5 | 0.5 | 0.185 | 0.0625 | $[(\Delta v > th_{vh}$ and $\Delta h \leq th_{vh})$ or $(\Delta v \leq th_{vh}$ and $\Delta h > th_{vh})]$ and $[(\Delta d_1 > th_d$ and $\Delta d_2 \leq th_d)$ or $(\Delta d_1 \leq th_d$ and $\Delta d_2 > th_d)]$ |
| 6 | 0.75 | — | 0.125 | $(\Delta v > th_{vh}$ and $\Delta h > th_{vh})$ and $[(\Delta d_1 > th_d$ and $\Delta d_2 \leq th_d)$ or $(\Delta d_1 \leq th_d$ and $\Delta d_1 > th_d)]$ |
| 7 | 0.5 | 0.125 | — | $\Delta v \leq th_{vh}$ and $\Delta h \leq th_{vh}$ and $\Delta d_1 > th_d$ and $\Delta d_1 > th_d$ |
| 8 | 0.5 | 0.25 | — | $[(\Delta v > th_{vh}$ and $\Delta h \leq th_{vh})$ or $(\Delta v \leq th_{vh}$ and $\Delta h > th_{vh})]$ and $\Delta d_1 > th_d$ and $\Delta d_2 > th_d$ |
| 9 | 1.0 | — | — | otherwise |

The invention claimed is:

1. Imaging apparatus, comprising:
a mosaic image sensor, which is configured to generate a stream of input pixel values belonging to a plurality of input sub-images, each input sub-image responsive to light of a different, respective color that is incident on the mosaic image sensor, wherein the input sub-images have an input blur caused by a point spread function (PSF) of a set of objective optics;
an image restoration circuit, which is coupled to receive and digitally filter the input pixel values in each of the input sub-images so as to generate a corresponding plurality of enhanced output sub-images, the image restoration circuit comprising a deconvolution filter (DCF) having a filter kernel, the DCF undoing effects of the PSF to cause the output sub-images to have an output blur that is less than the input blur; and
an image signal processor (ISP), which is coupled to receive and process the plurality of output sub-images in order to generate a color output image.

2. The apparatus according to claim 1, wherein the input sub-images and the output sub-images have identical formats, so that the ISP can be coupled to receive and process either the output sub-images or the input sub-images.

3. The apparatus according to claim 2, wherein the input pixel values in the plurality of input sub-images are interleaved in a predetermined interleaving pattern in a single input pixel stream that is output by the mosaic image sensor, and wherein the output sub-images comprise output pixel values, which are interleaved by the image restoration circuit in an output pixel stream according to the predetermined interleaving pattern.

4. The apparatus according to claim 1, wherein the PSF varies over a plane of the image sensor, and wherein the image restoration circuit is arranged to apply different filter kernels to the input pixel values from different areas of the image sensor responsively to a variation of the PSF over the plane of the image sensor.

5. The apparatus according to claim 1, wherein the image restoration circuit is arranged to apply different filter kernels to the input pixel values depending on a characteristic of the input sub-images.

6. The apparatus according to claim 1, wherein the mosaic image sensor comprises an array of filters that are arranged in a Bayer mosaic pattern.

7. The apparatus according to claim 6, wherein the input pixel values comprise first rows of alternating green and blue pixels and second rows of alternating green and red pixels, and wherein the image restoration circuit comprises a green balance unit, which is coupled to compensate for a variation in a sensitivity of the green pixels between the first and second rows.

8. The apparatus according to claim 7, wherein the variation in the sensitivity is non-uniform over an area of the image sensor, and wherein the green balance unit is arranged to apply a non-uniform compensation responsively to the non-uniform variation in the sensitivity.

9. The apparatus according to claim 1, further comprising the objective optics, which are configured to focus light onto the mosaic image sensor with a predetermined blur, wherein the image restoration circuit comprises a spike removal unit, which identifies faulty pixels having input pixel values that differ from the input pixel values of neighboring pixels within each of the input sub-images by more than a maximum difference, which is determined according to the predetermined blur, and to correct the input pixel values of the faulty pixels.

10. The apparatus according to claim 1, wherein the image restoration circuit comprises a noise filter, which is arranged to digitally filter each of the input sub-images in order to reduce noise in the input sub-images.

11. The apparatus according to claim 10, wherein the noise filter is arranged to determine directions and magnitudes of local gradients in the input sub-images, and to select filter kernels for application in reducing the noise responsively to the directions and the magnitudes.

12. The apparatus according to claim 10, wherein the DCF is arranged to filter the input sub-images after reduction of the noise by the noise filter.

13. The apparatus according to claim 12, wherein the image restoration circuit comprises an edge detector, which is arranged to identify edge regions in the input sub-images, and to control an input to the DCF so that the DCF receives the input pixel values without noise filtering in the edge regions and receives noise-reduced input pixel values from the noise filter outside the edge regions.

14. The apparatus according to claim 13, wherein the edge detector is arranged to detect edge pixels, and wherein the image restoration circuit comprises a widening unit, which is arranged to widen the edge regions by adding pixels to the edge region around the edge pixels.

15. The apparatus according to claim 14, wherein the widening unit is arranged to receive from the edge detector an identification of an edge pixel in a first one of the input sub-images, and to add to the edge region pixels in a neighborhood of the edge pixel in at least a second one of the input sub-images.

16. The apparatus according to claim 1, wherein the DCF is arranged to convolve the input sub-images with a kernel of a given size, and wherein the apparatus further comprises a framing extension unit, which is arranged to add a margin of pixel values around the input sub-images, the margin having a width selected responsively to the size of the filter kernel.

17. The apparatus according to claim 1, wherein the input pixel values in the plurality of the input sub-images are interleaved in a predetermined interleaving pattern in a single input pixel stream that is output by the mosaic image sensor, and wherein the DCF is arranged to convolve each of the input sub-images with a respective kernel, which is masked, responsively to the interleaving pattern, so as to filter each of the input sub-images separately from the other input sub-images.

18. A method for imaging, comprising:
receiving from a mosaic image sensor a stream of input pixel values belonging to a plurality of input sub-images, each input sub-image responsive to light of a different, respective color that is incident on the mosaic image sensor, wherein the input sub-images have an input blur caused by a point spread function (PSF) of a set of objective optics;
digitally filtering the input pixel values in each of the input sub-images so as to generate a corresponding plurality of enhanced output sub-images, wherein digitally filtering comprises applying a deconvolution filter (DCF), having a filter kernel, to the input sub-images to undo effects of the PSF to cause the output sub-images to have an output blur that is less than the input blur; and
processing the output sub-images to generate a color output image.

19. The method according to claim 18, wherein the input sub-images and the output sub-images have identical formats.

20. The method according to claim 19, wherein the input pixel values in the plurality of the input sub-images are interleaved in a predetermined interleaving pattern in a single input pixel stream that is output by the mosaic image sensor, and wherein digitally filtering the input pixel values comprises interleaving output pixel values of the output sub-images in an output pixel stream according to the predetermined interleaving pattern.

21. The method according to claim 18, wherein the PSF varies over a plane of the image sensor, and wherein applying the DCF comprises applying different filter kernels to the input pixel values from different areas of the image sensor responsively to a variation of the PSF over the plane of the image sensor.

22. The method according to claim 18, wherein applying the DCF comprises applying different filter kernels to the input pixel values depending on a characteristic of the input sub-images.

23. The method according to claim 18, wherein the mosaic image sensor comprises an array of filters that are arranged in a Bayer mosaic pattern.

24. The method according to claim 23, wherein the input pixel values comprise first rows of alternating green and blue pixels and second rows of alternating green and red pixels, and wherein the method further comprises processing the input pixel values to compensate for a variation in a sensitivity of the green pixels between the first and second rows before digitally filtering the input pixel values.

25. The method according to claim 24, wherein the variation in the sensitivity is non-uniform over an area of the image sensor, and wherein processing the input pixel values comprises applying a non-uniform compensation responsively to the non-uniform variation in the sensitivity.

26. The method according to claim 18, wherein light is focused onto the mosaic image sensor by the objective optics with a predetermined blur, and wherein the method further comprises identifying faulty pixels having input pixel values that differ from the input pixel values of neighboring pixels within each of the input sub-images by more than a maximum difference, which is determined according to the predetermined blur, and correcting the input pixel values of the faulty pixels.

27. The method according to claim 18, wherein digitally filtering the input pixel values further comprises processing each of the input sub-images in order to reduce noise in the input sub-images.

28. The method according to claim 27, wherein processing each of the input-sub-images comprises determining directions and magnitudes of local gradients in the input sub-images, and selecting filter kernels for application in reducing the noise responsively to the directions and the magnitudes.

29. The method according to claim 27, wherein the DCF is applied to the input sub-images after the input sub-images have been processed to reduce noise.

30. The method according to claim 29, wherein applying the DCF comprises identifying edge regions in the input sub-images, and controlling an input to the DCF so that in the edge regions, the DCF receives the input pixel values without the processing to reduce the noise, and outside the edge regions, the DCF receives noise-reduced input pixel values after the processing to reduce the noise.

31. The method according to claim 30, wherein identifying the edge regions comprises detecting edge pixels, and widening the edge regions by adding pixels to the edge region around the edge pixels.

32. The method according to claim 31, wherein widening the edge regions comprises detecting an edge pixel in a first one of the input sub-images, and adding to the edge region pixels in a neighborhood of the edge pixel in at least a second one of the input sub-images.

33. The method according to claim 18, wherein applying a DCF comprises applying a DCF having a kernel of a given size, and wherein the method further comprises, before digitally filtering the input sub-images, adding a margin of pixel values around the input sub-images, the margin having a width selected responsively to the size of the kernel.

34. The method according to claim 18, wherein the input pixel values in the plurality of the input sub-images are interleaved in a predetermined interleaving pattern in a single input pixel stream that is output by the mosaic image sensor, and wherein applying a DCF comprises applying a respective kernel, which is masked, to each of the input sub-images responsively to the interleaving pattern, so as to filter each of the input sub-images separately from the other input sub-images.

* * * * *